United States Patent
Balasundaram et al.

(10) Patent No.: US 10,834,103 B2
(45) Date of Patent: Nov. 10, 2020

(54) TRACKING AND MITIGATION OF AN INFECTED HOST DEVICE

(71) Applicant: Juniper Networks, Inc., Sunnyvale, CA (US)

(72) Inventors: Karthik Ragunath Balasundaram, Sunnyvale, CA (US); Prakash T. Seshadri, Fremont, CA (US); Daniel J. Quinlan, San Francisco, CA (US); Volodymyr Kuznetsov, Austin, TX (US); Rakesh Kumar, San Ramon, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 170 days.

(21) Appl. No.: 15/942,530

(22) Filed: Apr. 1, 2018

(65) Prior Publication Data
US 2018/0288078 A1    Oct. 4, 2018

Related U.S. Application Data

(60) Provisional application No. 62/480,923, filed on Apr. 3, 2017.

(51) Int. Cl.
*H04L 29/06* (2006.01)
*G06F 21/56* (2013.01)
*H04L 29/12* (2006.01)

(52) U.S. Cl.
CPC .......... *H04L 63/1416* (2013.01); *G06F 21/56* (2013.01); *H04L 63/1433* (2013.01);
(Continued)

(58) Field of Classification Search
CPC . H04L 63/1416; H04L 63/1433; H04L 63/20; H04L 61/6022; H04L 63/1441;
(Continued)

(56) References Cited

U.S. PATENT DOCUMENTS

| | | | | |
|---|---|---|---|---|
| 7,398,310 B1* | 7/2008 | Kuehl | ................. | H04L 63/1416 709/224 |
| 7,676,217 B2* | 3/2010 | Zhu | ..................... | H04L 63/1408 455/411 |

(Continued)

FOREIGN PATENT DOCUMENTS

| CN | 101778112 A | 7/2010 |
|---|---|---|
| CN | 102571469 A | 7/2012 |

(Continued)

OTHER PUBLICATIONS

Yen, Ting-Fang et al., "Traffic Aggregation for Malware Detection", DIMVA 2008, LNCS 5137, pp. 207-227. (Year: 2008).*

(Continued)

*Primary Examiner* — Michael Pyzocha
(74) *Attorney, Agent, or Firm* — Harrity & Harrity, LLP

(57) ABSTRACT

A security platform may determine mapped attribute information associated with a plurality of host identifiers. The mapped attribute information may include information that identifies a set of related attributes. The security platform may determine, based on the mapped attribute information, that a host device is associated with at least two host identifiers of the plurality of host identifiers. The security platform may aggregate, based on the at two least host identifiers, threat information as aggregated threat information associated with the host device. The security platform may classify the host device as an infected device or a suspicious device based on the aggregated threat information.

20 Claims, 6 Drawing Sheets

(52) U.S. Cl.
CPC ...... *H04L 61/6022* (2013.01); *H04L 63/1441* (2013.01); *H04L 63/20* (2013.01)

(58) Field of Classification Search
CPC ... H04L 63/145; H04L 63/0236; G06F 21/56; G06F 21/57
See application file for complete search history.

(56) References Cited

U.S. PATENT DOCUMENTS

| | | | | |
|---|---|---|---|---|
| 8,479,057 | B2* | 7/2013 | Poletto | H04L 63/1416 714/47.3 |
| 8,695,092 | B2* | 4/2014 | Manianchira | H04L 63/1441 726/22 |
| 9,208,323 | B1* | 12/2015 | Karta | G06F 21/577 |
| 9,516,053 | B1* | 12/2016 | Muddu | H04L 43/08 |
| 9,763,100 | B2* | 9/2017 | Tang | H04L 51/04 |
| 9,832,221 | B1* | 11/2017 | Newstadt | G06F 21/316 |
| 10,091,312 | B1* | 10/2018 | Khanwalkar | H04L 67/22 |
| 10,237,294 | B1* | 3/2019 | Zadeh | H04L 63/1425 |
| 10,291,637 | B1* | 5/2019 | Bardenstein | H04L 63/1416 |
| 2007/0124801 | A1* | 5/2007 | Thomas | G06F 21/00 726/3 |
| 2008/0244744 | A1* | 10/2008 | Thomas | H04L 63/0281 726/23 |
| 2010/0235915 | A1* | 9/2010 | Memon | H04L 63/145 726/23 |
| 2010/0313264 | A1* | 12/2010 | Xie | H04L 63/101 726/22 |
| 2011/0088092 | A1* | 4/2011 | Nguyen | H04L 63/1466 726/22 |
| 2011/0252472 | A1* | 10/2011 | Ehrlich | H04L 51/00 726/22 |
| 2014/0283061 | A1 | 9/2014 | Quinlan et al. | |
| 2015/0058976 | A1* | 2/2015 | Carney | H04L 63/1408 726/22 |
| 2015/0101050 | A1* | 4/2015 | Nielson | G06F 21/552 726/23 |
| 2015/0161616 | A1* | 6/2015 | Brunet | G06F 1/24 713/1 |
| 2015/0373039 | A1* | 12/2015 | Wang | H04L 63/1425 726/23 |
| 2015/0381637 | A1* | 12/2015 | Raff | H04L 63/1416 726/23 |
| 2016/0021141 | A1* | 1/2016 | Liu | H04L 63/1433 726/23 |
| 2016/0191549 | A1* | 6/2016 | Nguyen | H04L 63/1425 726/23 |
| 2016/0203491 | A1* | 7/2016 | Ranganathan | G06Q 20/4016 705/44 |
| 2017/0214709 | A1* | 7/2017 | Maestas | H04L 63/1433 |
| 2017/0223049 | A1* | 8/2017 | Kuperman | H04L 63/1466 |
| 2017/0251013 | A1* | 8/2017 | Kirti | H04L 63/1416 |
| 2017/0359227 | A1* | 12/2017 | Foremski | H04L 61/2007 |
| 2017/0366576 | A1* | 12/2017 | Donahue | H04L 63/0236 |
| 2018/0004948 | A1* | 1/2018 | Martin | H04L 63/1425 |
| 2018/0063072 | A1* | 3/2018 | Wackerly | H04L 69/161 |
| 2018/0068119 | A1* | 3/2018 | Mitelman | G06F 21/554 |
| 2018/0113952 | A1* | 4/2018 | Brown | G06F 21/6227 |
| 2018/0115578 | A1* | 4/2018 | Subbarayan | H04L 63/1458 |

FOREIGN PATENT DOCUMENTS

| | | |
|---|---|---|
| CN | 103379099 A | 10/2013 |
| CN | 103428189 A | 12/2013 |

OTHER PUBLICATIONS

Juniper Networks et al., "Security Director, Security Director User Guide", https://www.juniper.net/documentation/en_US/junos-space16.2/information-products/pathway-pages/security-director-user-guide.pdf, Dec. 16, 2016, p. 512.

Extended European Search Report corresponding to EP Application No. 18165508.5, dated Jul. 13, 2018, 10 pages.

* cited by examiner

TRACKING AND MITIGATION OF AN INFECTED HOST DEVICE

RELATED APPLICATION

This application claims priority under 35 U.S.C. § 119 to U.S. Provisional Patent Application No. 62/480,923, filed on Apr. 3, 2017, the content of which is incorporated by reference herein in its entirety.

BACKGROUND

Blocking may prevent a host device from communicating with another device based on an identifier used by a network and/or by access control to the network (e.g., an Internet protocol (IP) address, a media access control (MAC) address, a username, and/or the like). For example, blocking may prevent the host device from communicating with another host device when the host device is classified as being infected with a virus, having engaged in a suspicious activity (e.g., downloading malware, accessing a malicious server, or the like). Other security measures that may be used against such a host device include throttling the host device, subjecting the host device to greater scrutiny, slotting the host device for investigation, redirecting the host device, putting the host device into a walled garden, or otherwise restricting the host device in some way.

SUMMARY

According to some possible implementations, a security platform may include on or more processors to: determine mapped attribute information associated with a plurality of host identifiers, where the mapped attribute information may include information that identifies a set of related attributes; determine, based on the mapped attribute information, that a host device is associated with at least two host identifiers of the plurality of host identifiers; aggregate, based on the at two least host identifiers, threat information as aggregated threat information associated with the host device; and classify the host device as an infected device or a suspicious device based on the aggregated threat information.

According to some possible implementations, a non-transitory computer-readable medium may store instructions that, when executed by one or more processors, cause the one or more processors to: receive mapped attribute information associated with a plurality of host identifiers, wherein the mapped attribute information may include information that identifies a set of related attributes; determine, based on the mapped attribute information, that a host device is associated with at least two host identifiers of the plurality of host identifiers; aggregate, based on the at least two host identifiers, threat information as aggregated threat information associated with the host device; and perform an action based on aggregating the threat information.

According to some possible implementations, a method may include: determining, by a security platform, mapped attribute information associated with a plurality of host identifiers, wherein the mapped attribute information may include information that identifies a set of related attributes; determining, by the security platform and based on the mapped attribute information, that a host device is associated with at least two host identifiers of the plurality of host identifiers; aggregating, by the security platform and based on the at two least host identifiers, threat information as aggregated threat information associated with the host device; and classifying, by the security platform, the host device as an infected device or a suspicious device based on the aggregated threat information.

DETAILED DESCRIPTION

Figure 1A:
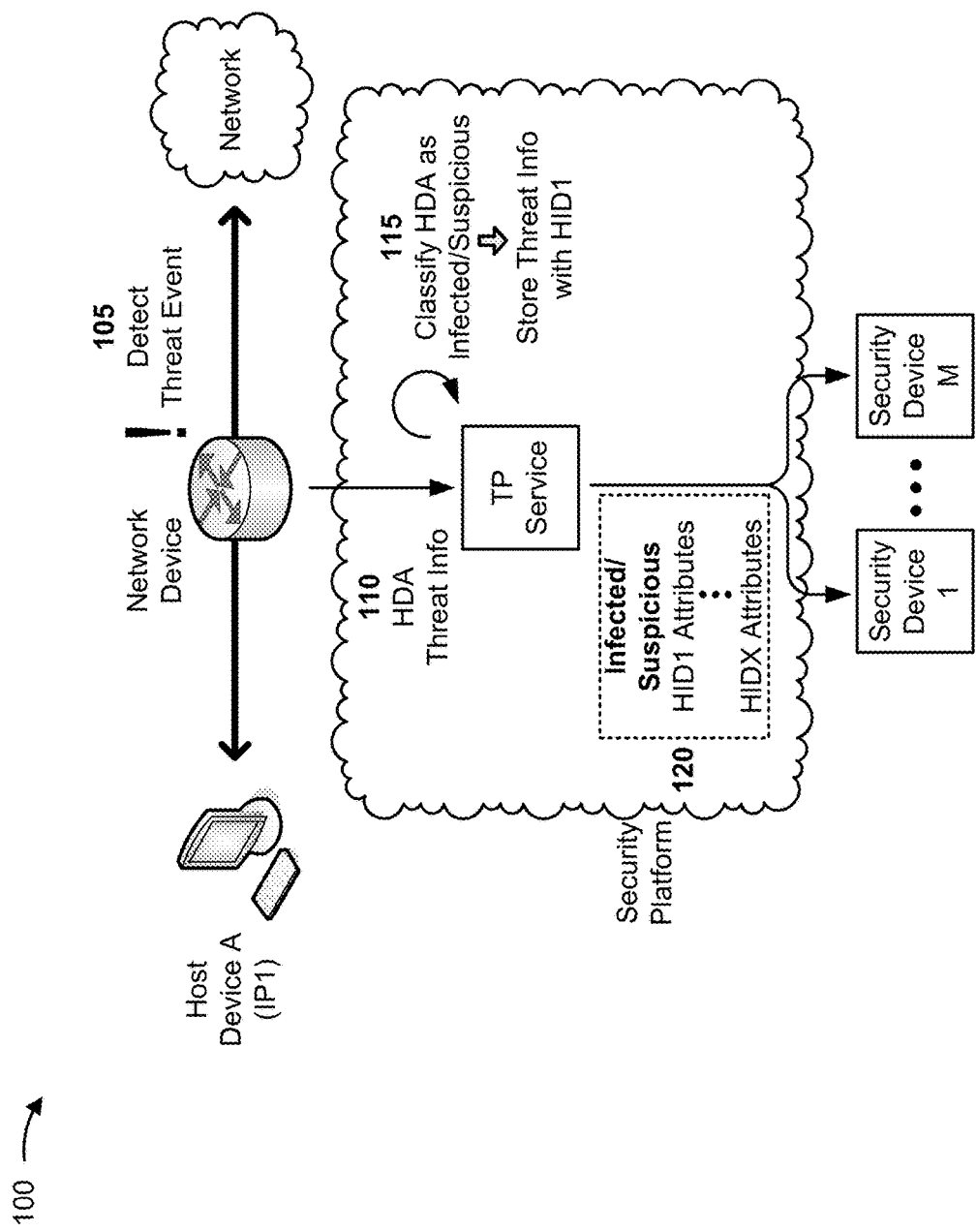
FIGS. 1A and 1B are diagrams of an overview of an example implementation described herein.

The following detailed description of example implementations refers to the accompanying drawings. The same reference numbers in different drawings may identify the same or similar elements.

A host device may become infected by, for example, downloading malware, upon being compromised (e.g., due to stolen credentials, being remotely controlled, and/or the like). When mitigating a threat associated with the infection, an important concern is preventing the infected host device from infecting other host devices. A security platform (e.g., one or more devices that host a threat protection service and/or one or more other security services) may be configured to address this concern by implementing a blocking technique (e.g., based on an IP address, a MAC address, a username, and/or the like) at a network device associated with the infected host device. Here, upon determining that the host device is infected, the security platform may determine an attribute (e.g., an IP address, a MAC address, a username and/or the like) associated with the infected host device, and prevent the infected host device from communicating with one or more other host devices based on the attribute (e.g., by identifying and blocking communications associated with the attribute). Notably, while some implementations described herein describe use of a blocking technique against the infected host device, another type of action may be taken. Such actions include, but are not limited to, throttling the host device, subjecting the host device to greater scrutiny, slotting the host device for investigation, redirecting the host device, putting the host device into a walled garden, or otherwise restricting the host device in some way. In other words, the implementations described herein may be used in association with using one or security measures other than blocking.

In some implementations, the attribute may be a static attribute, a semi-static attribute (e.g., an attribute that may be static or dynamic in different circumstances), or a dynamic attribute. For example, the attribute may be an IP address, a hostname, a MAC address, a username (e.g., a lightweight directory access protocol (LDAP) username), a single sign-on username, and/or the like.

However, such a blocking technique may fail to provide protection when, for example, the blocking technique is based on an attribute that has or can be changed. For example, if the host device switches from one IP address to another IP address (i.e., is assigned different IP address at a later time), or if the IP address is spoofed, then a blocking technique that uses IP addresses as a basis for blocking may fail to provide protection. Generally, if the host device switches from one attribute to another attribute, then a blocking technique that uses the attribute as a basis for blocking may fail to provide protection.

Moreover, such a blocking technique may result in a clean host device (i.e., a host device that is not infected) being prevented from communicating with other host devices. For example, in the case of blocking based on an IP address, an IP address that was previously assigned to the infected host device may be reassigned to a clean host device (e.g., after the infected host device leaves a network associated with both host devices). In such a case, the clean host device may be prevented from communicating with other host devices as a result of the IP address being previously associated with the infected host device.

Furthermore, aggregating threat information associated with a given host device (e.g., information associated with one or more threat events based on which the given host device may be determined to be infected) may be difficult or impossible in a case where an attribute of the given host device is changed. Thus, a classification of the given host device as infected or suspicious may be based on threat information associated with a single instance of the attribute (e.g., a single IP address), which may reduce accuracy of and/or confidence in the classification.

Implementations described herein provide a security platform capable of aggregating threat information, associated with a host device, even when the host device has one or more that have or can be changed attributes. In some implementations, the security platform may aggregate the threat information based on mapped attribute information, associated with the host device, that identifies an association between at least two attributes of the host device.

In some implementations, based on the aggregated threat information, the security platform may perform an improved classification of the host device as infected or suspicious (e.g., as compared to a classification based on threat information associated with a single instance of an attribute and/or threat information associated with a single threat event), thereby improving network security. Additionally, or alternatively, the security platform may deprioritize (i.e., cease blocking) one or more attributes previously associated with the host device, thereby preventing communications of other host devices from being improperly blocked.

Figure 1B:
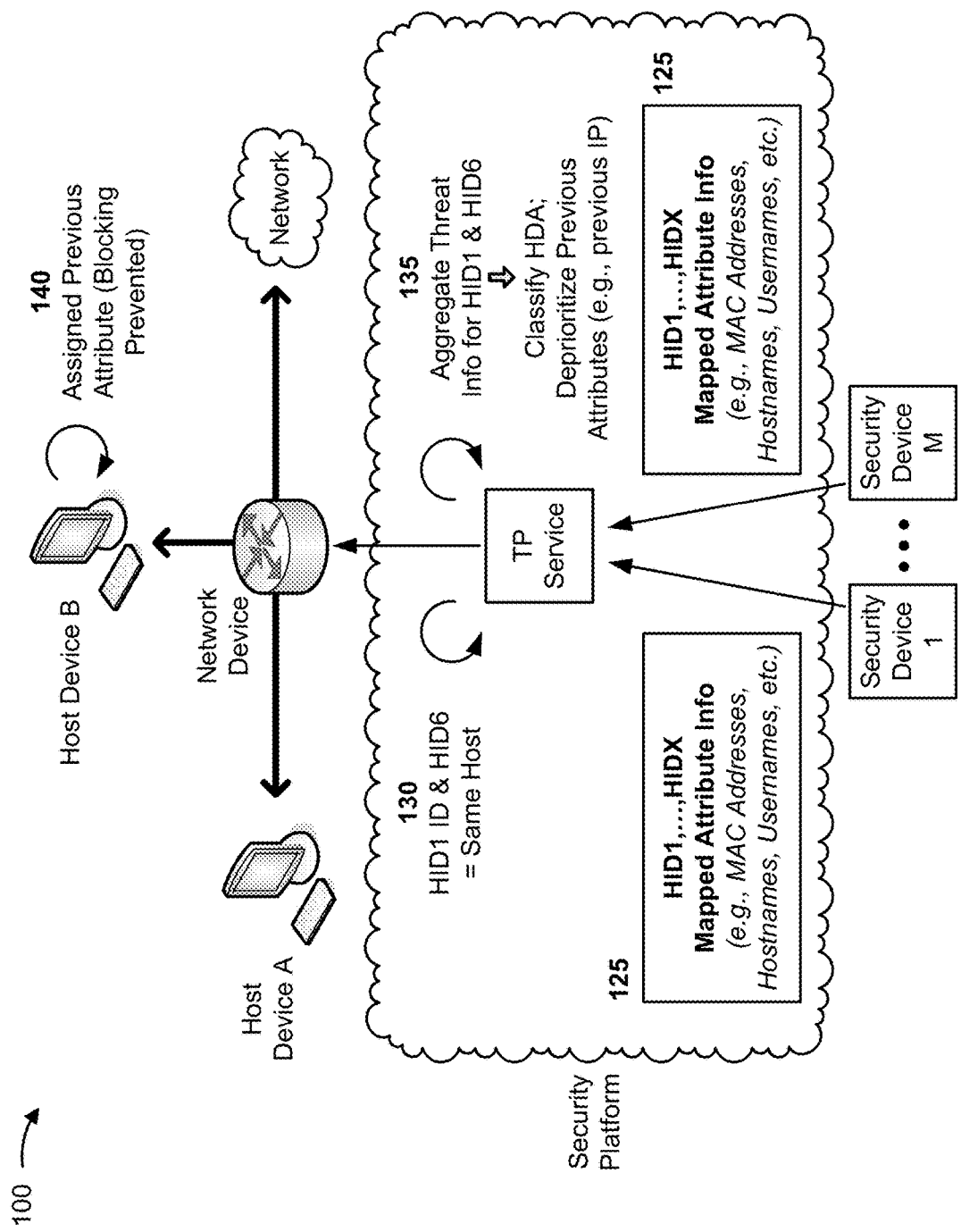

FIGS. 1A and 1B are diagrams of an overview of an example implementation 100 described herein. As shown in FIG. 1A, assume that a host device (e.g., host device A (HDA)) is assigned a first attribute (e.g., a first IP address (IP1)), and is communicating with another device (e.g., such as a server included in a network, such as an intranet, the Internet, and/or the like) via a network device (e.g., a router, a gateway, a switch, etc.).

As shown in FIG. 1A, and by reference number 105, the network device may detect a threat event associated with host device A. The threat event may include, for example, an event such as an instance of malware being downloaded by host device A, an instance of host device A accessing or attempting to access a server known to be malicious, an instance of host device A exhibiting behavior indicative of being infected, or the like.

As shown by reference number 110, the network device may provide, to a security platform associated with providing a threat protection service, threat information associated with the threat event. The threat information may include, for example, information associated with one more threat events associated with host device A, such as attribute information associated with host device A (e.g., information associated with one or more attributes, such as an IP address (IP1)), information associated with the threat event (e.g., a timestamp, a hash value of a downloaded file that triggered the threat event, a score or a metric associated with the threat event, information that identifies a name of the threat event and/or a type of the threat event), or the like.

As shown by reference number 115, the security platform (e.g., a threat protection service hosted on the security platform) may classify, based on the threat information, host device A as an infected device or a suspicious device. An infected device may include a host device that is to be blocked from communicating with other devices (e.g., other host devices, a server, a network device, or the like) due to being identified as a threat to other devices. A suspicious device may include a host device that is permitted to continue communicating with other devices, but that is to be monitored due to engaging in suspicious activity. In some implementations, the security platform may classify host device A as infected or suspicious based on a threat assessment algorithm configured on the security platform, as described below.

As further shown, based on classifying host device A as an infected device or a suspicious device, the security platform may store the threat information with a host identifier (e.g., an identification number or name) that corresponds to the attribute information. For example, the security platform may determine whether the security platform stores a host identifier that corresponds to the attribute information (e.g., whether a host identifier was already created for IP1) associated with the threat event. If no host identifier exists, then the security platform 215 may create a new host identifier (e.g., HID1) and associate the attribute information and the threat information with the new host identifier. Alternatively, if a host identifier exists for the attribute information, then the security platform 215 may associate the attribute information and the threat information with the existing host identifier.

As shown by reference number 120, the security platform may provide, to one or more security services (e.g., security services 1 through M hosted by, for example, one or more security devices, the security platform, the network device, or the like), the attribute information associated with the host identifier (i.e., the attribute information associated with host device A at the time of the threat event). The security platform may provide, to the one or more security services, attribute information associated with a group of (i.e., multiple) host identifiers (e.g., HID2 through HIDX), which may be associated with host device A and/or one or more other host devices, in a similar manner.

As shown in FIG. 1B, and by reference number 125, based on the attribute information provided by the security platform, the one or more security services may provide, to the security platform, mapped attribute information associated with the group of host identifiers.

The mapped attribute information may include information that identifies two or more related attributes. For example, the mapped attribute information may include information that identifies a first attribute, associated with a first host identifier (e.g., IP1 associated with HID1) and a second attribute related to the first attribute (e.g., a MAC address (MAC1) associated with IP1). Continuing with this example, the mapped attribute information may include information that identifies a third attribute associated with a second host identifier (e.g., IP6 associated with HID6), and may include information that identifies the second attribute as being related to the third attribute (e.g., MAC1 associated with the IP6). Notably, in this example, the same attribute (the second attribute) is associated with both the first and third attributes. Additional examples of mapped attribute information are described below. In some implementations, the one or more security services may determine the mapped attribute information during provisioning of the respective services.

As shown by reference number 130, based on the mapped attribute information, the security platform may determine that host device A is associated with at least two host identifiers of the group of host identifiers (e.g., including HID and HID6, as shown in FIG. 1B). For example, when the mapped attribute information includes the example mapped attribute information described above, the security platform may determine that host device A is associated with the first attribute (e.g., IP1, a current IP address) and the third attribute (e.g., IP6, a previously assigned IP address) since both the first attribute and the third attribute are associated with the second attribute (e.g., MAC1).

As shown by reference number 135, based on determining that host device A is associated with the at least two host identifiers, the security platform may aggregate threat information associated with the at two least host identifiers (e.g., based on threat information, associated with HID and HID6, stored or accessible by the security platform). As further shown, the security platform may again classify host device A as infected or suspicious based on the aggregated threat information (e.g., in a manner similar to that described above). In this way, a security platform may aggregate threat information, associated with a host device, based on at least two host identifiers associated with the host device. In some implementations, based on the aggregated threat information, the security platform may perform an improved classification of the host device as infected or suspicious (e.g., relative to not aggregating the threat information), thereby improving network security. Further, based on the aggregated threat information, the security platform may achieve improved monitoring and/or tracking of non-infected and/or compromised host devices, in some implementations.

Additionally, or alternatively, the security platform may deprioritize one or more attributes associated with one of the at least two host identifiers. For example, as further shown in FIG. 1B by reference number 135, since host device A is currently assigned IP1, the security platform may deprioritize IP addresses previously assigned to host device A (e.g., IP6). Thus, as shown by reference number 140, when another device (e.g., host device B) is assigned an IP address that was previously assigned to host device A, improper blocking, associated with the attribute previously assigned to host device A, is prevented. In some implementations, the security platform may store and/or provide associated with a such a deprioritization for use for in analysis, historical analysis, forensics, and/or the like.

As indicated above, FIGS. 1A and 1B are provided merely as an example. Other examples are possible and may differ from what was described with regard to FIGS. 1A and 1B.

Figure 2:
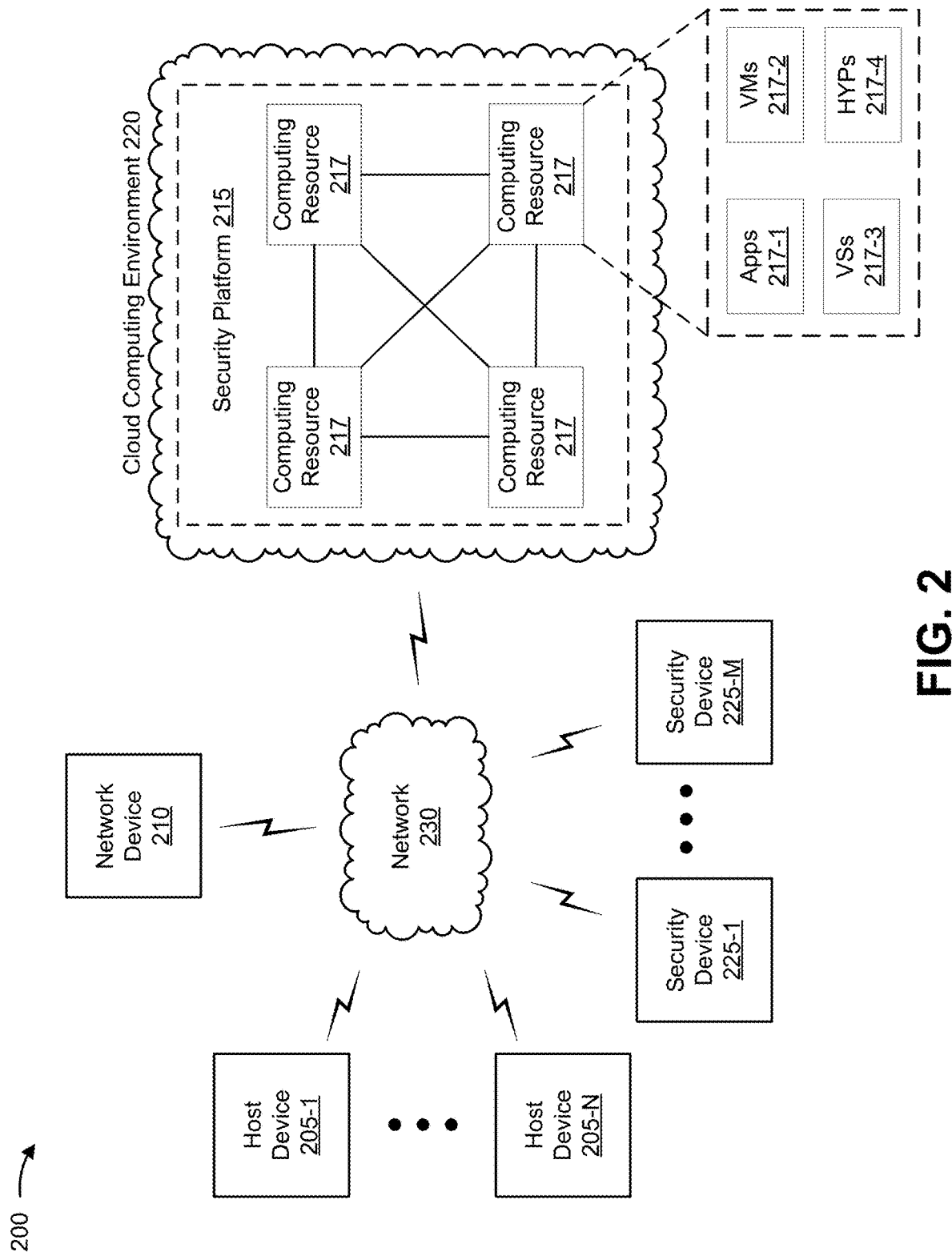
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more host devices 205-1 through 205-N (N≥1) (hereinafter referred to collectively as host devices 205, and individually as host device 205), a network device 210, a security platform 215 hosted in a cloud computing environment 220, one or more security devices 225-1 through 225-M (M≥1) (hereinafter referred to collectively as security devices 225, and individually as security device 225), and a network 230. Devices of environment 200 may interconnect via wired connections, wireless connections, or a combination of wired and wireless connections.

Host device 205 includes a device capable of communicating with another device (e.g., another host device 205, a server device, a network device, or the like) via network device 210. For example, host device 205 may include a user device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device. As another example, host device 205 may include a server or a group of servers. As a further example, host device 205 may include an endpoint device or an edge device.

Network device 210 includes one or more devices (e.g., one or more traffic transfer devices) capable of processing and/or transferring traffic between host device 205 and another device (e.g., a device with which host device 205 is to communicate). For example, network device 210 may include a firewall, a router, a gateway, a switch, a hub, a bridge, a reverse proxy, a server (e.g., a proxy server), a security device, an intrusion detection device, a load balancer, or a similar device.

Security platform 215 includes one or more devices capable of aggregating threat information, associated with host device 205, even when host device 205 has one or more attributes that have or can be changed. In some implementations, security platform 215 may be capable of determining whether host device 205 is infected or suspicious based on the aggregated threat information. For example, security platform 215 may include a server or a group of servers. In some implementations, security platform 215 may be hosted in cloud computing environment 220. Notably, while implementations described herein describe security platform 215 as being hosted in cloud computing environment 220, in some implementations, security platform 215 may not be cloud-based or may be partially cloud-based.

Cloud computing environment 220 includes an environment that delivers computing as a service, whereby shared resources, services, etc. may be provided to host security platform 215. Cloud computing environment 220 may provide computation, software, data access, storage, and/or other services that do not require end-user knowledge of a physical location and configuration of a system and/or a device that delivers the services. As shown, cloud computing environment 220 may include a group of computing resources 217 associated with hosting security platform 215.

Computing resource 217 includes one or more personal computers, workstation computers, server devices, or another type of computation and/or communication device. In some implementations, computing resource 217 may host security platform 215. The cloud resources may include compute instances executing in computing resource 217, storage devices provided in computing resource 217, data transfer devices provided by computing resource 217, etc. In some implementations, computing resource 217 may communicate with other computing resources 217 via wired connections, wireless connections, or a combination of wired and wireless connections.

As further shown in FIG. 2, computing resource 217 may include a group of cloud resources, such as one or more applications (APPs) 217-1, one or more virtual machines (VMs) 217-2, virtualized storage (VSs) 217-3, one or more hypervisors (HYPs) 217-4, or the like.

Application 217-1 includes one or more software applications that may be provided to or accessed by network device 210. Application 217-1 may eliminate a need to install and execute the software applications on network device 210. For example, application 217-1 may include software associated with security platform 215 and/or any other software capable of being provided via cloud computing environment 220. In some implementations, one application 217-1 may send/receive information to/from one or more other applications 217-1, via virtual machine 217-2.

Virtual machine 217-2 includes a software implementation of a machine (e.g., a computer) that executes programs like a physical machine. Virtual machine 217-2 may be either a system virtual machine or a process virtual machine, depending upon use and degree of correspondence to any real machine by virtual machine 217-2. A system virtual machine may provide a complete system platform that supports execution of a complete operating system (OS). A process virtual machine may execute a single program, and may support a single process. In some implementations, virtual machine 217-2 may execute on behalf of a user (e.g., network device 210), and may manage infrastructure of cloud computing environment 220, such as data management, synchronization, or long-duration data transfers.

Virtualized storage 217-3 includes one or more storage systems and/or one or more devices that use virtualization techniques within the storage systems or devices of computing resource 217. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 217-4 provides hardware virtualization techniques that allow multiple operating systems (e.g., guest operating systems) to execute concurrently on a host computer, such as computing resource 217. Hypervisor 217-4 may present a virtual operating platform to the guest operating systems, and may manage the execution of the guest operating systems. Multiple instances of a variety of operating systems may share virtualized hardware resources.

Security device 225 includes a device associated with providing one or more security services, such as a firewall service, a threat detection service, a malware blocking service, an intrusion detection service, or the like. For example, security device 225 may include a server, a group of servers, a network device (e.g., a firewall, an intrusion detection device, etc.), or the like. In some implementations, security device 225 may be capable of determining and providing attribute information, associated with one or more IP addresses, to security platform 215, as described herein. In some implementations, security device 225 may be included in network device 210. Additionally, or alternatively, security device 225 may be hosted in security platform 215 and/or cloud computing environment 220.

Network 230 includes one or more wired and/or wireless networks. For example, network 230 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
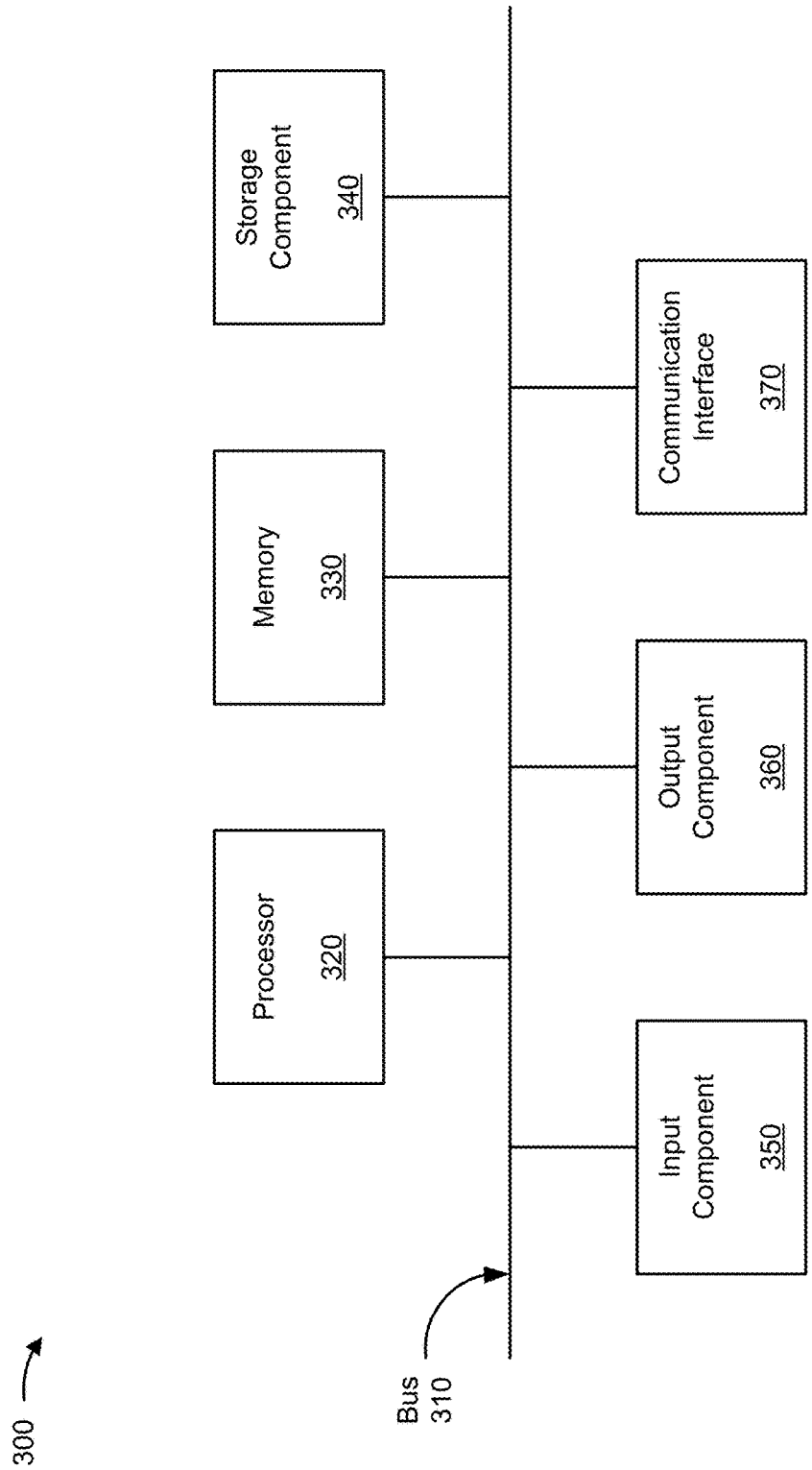
FIG. 3 is a diagram of example components of one or more devices of FIG. 2.

FIG. 3 is a diagram of example components of a device 300. Device 300 may correspond to host device 205, network device 210, security platform 215, and/or computing resource 217. In some implementations, host device 205, network device 210, security platform 215, and/or computing resource 217 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
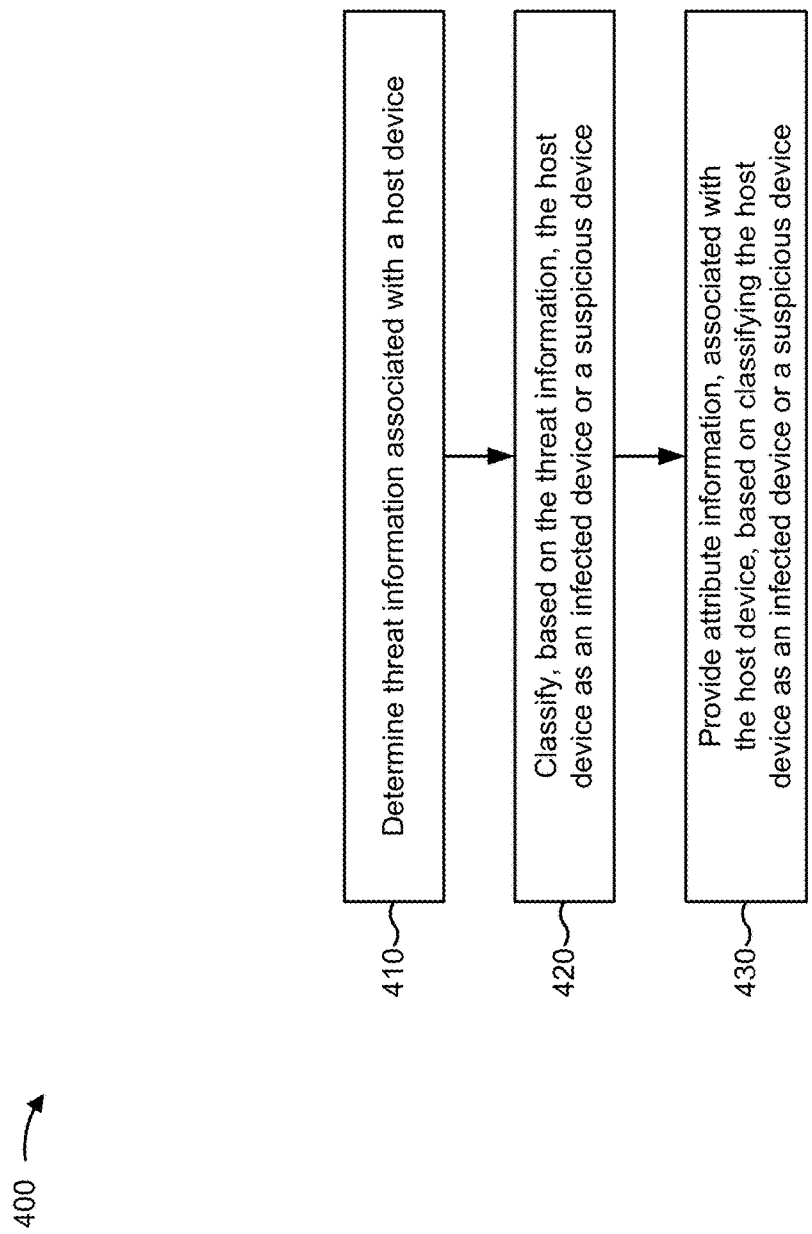
FIG. 4 is a flow chart of an example process for providing IP address information, associated with a host device, based on classifying the host device as an infected device or a suspicious device.

FIG. 4 is a flow chart of an example process 400 for providing attribute information, associated with a host device, based on classifying the host device as an infected device or a suspicious device. In some implementations, one or more process blocks of FIG. 4 may be performed by security platform 215. In some implementations, one or more process blocks of FIG. 4 may be performed by another device or a group of devices separate from or including security platform 215, such as network device 210.

As shown in FIG. 4, process 400 may include determining threat information associated with a host device (block 410). For example, security platform 215 may determine threat information associated with host device 205.

The threat information may include information associated with one more threat events detected in association with an activity of host device 205. A threat event may include, for example, an event such as an instance of malware being downloaded by host device 205, an instance of host device 205 accessing or attempting to access a server known to be malicious, an instance of host device 205 exhibiting behavior indicative of being infected, or the like.

In some implementations, the threat information may include information that identifies one or more attributes of host device 205, such as a dynamic attribute, a static attribute, a semi-static attribute, and/or the like. For example, the one or more attributes may include an IP address of host device 205, a hostname of host device 205, a MAC address associated with host device 205, a username, a LDAP username associated with host device 205, a single sign-on username associated with host device 205, or the like.

Additionally, the threat information may include information associated with the threat event, such as a timestamp associated with the threat event, a hash value of a downloaded file that triggered the threat event, a score or a metric associated with the threat event (e.g., a malware score of a downloaded file), information that identifies a name of the threat event, information that identifies a type of the threat event, a description of the threat event, and/or the like.

In some implementations, security platform 215 may determine the threat information based on information provided by network device 210 and/or security device 225. For example, network device 210 and/or security device 225 may be configured to detect one or more threat events, and may detect, based on the configuration, a threat event associated with host device 205 (e.g., when host device 205 is communicating with another device). Here, network device 210 and/or security device 225 may provide, to security platform 215, the threat information associated with the detected threat event, and security platform 215 may determine the threat information accordingly.

In some implementations, security platform 215 may automatically determine the threat information (e.g., when network device 210 provides the threat information upon detecting the threat event). Thus, in some implementations, security platform 215 may determine the threat information in real-time or near real-time. Additionally, or alternatively, security platform 215 may determine the threat information based on sending (e.g., based on user input, automatically on a periodic basis, and/or the like) a request to network device 210 to provide the threat information, and may determine the threat information based on a response to the request. In some implementations, security platform 215 may store the threat information (e.g., for analysis at a later time, as described below).

In some implementations, security platform 215 may assign the threat information to a host identifier (e.g., an identification number, a name, and/or the like) based on the attribute information. For example, security platform 215 may manage a list of host identifiers, associated with host devices 205 of the network, where each host identifier is defined by at least one attribute (e.g., included in attribute information received as a result of a threat event). Here, security platform 215 may identify a particular host identifier based on the attribute information (e.g., when an IP address in the attribute information matches an IP address associated with the particular host identifier, when a MAC address in the attribute information matches a MAC address associated with the particular host identifier, and/or the like), and assign the threat information to the particular host identifier. Alternatively, security platform 215 may determine that no host identifier exists for the attribute, and may create a new host identifier and associate the attribute information with the new host identifier. In this way, security platform 215 may store threat information associated with one more threat events for each host identifier (i.e., each set of attributes).

As further shown in FIG. 4, process 400 may include classifying, based on the threat information, the host device as an infected device or a suspicious device (block 420). For example, security platform 215 may classify, based on the threat information, that host device 205 as an infected device or a suspicious device.

An infected device may include a host device 205 that is to be blocked from communicating with other devices (e.g., other host devices 205, a server, a network device, or the like) due to being identified as a threat to other devices. For example, host device 205 may be determined to be an infected device when security platform 215 determines that host device 205 has been infected with malware. Here, security platform 215 may block the infected host device 205 from communicating with the other devices in order to prevent the infection from spreading to the other devices.

A suspicious device may include a host device 205 that is permitted to continue communicating with other devices, but that is to be monitored due to engaging in suspicious activity. For example, host device 205 may be determined to be a suspicious device when security platform 215 determines that host device 205 has accessed or attempted to access a server that is known to be malicious. Here, security platform 215 may monitor the suspicious host device 205 for further suspicious and/or malicious activity in order to allow for another classification of the suspicious host device 205.

In some implementations, security platform 215 may classify host device 205 as being an infected device or a suspicious device based on the threat information. For example, security platform 215 may be configured with a threat assessment algorithm that receives, as input, the threat information associated with host device 205, and provides, as an output, a classification of host device 205 as an infected device or a suspicious device.

In some implementations, the threat assessment algorithm may include a model trained based on historical threat information (i.e., threat information received at an earlier time). For example, security platform 215 may train the model based on a machine learning algorithm, an artificial intelligence method, or the like. The model may be trained based on a training set of historical threat information and information indicating whether host devices 205, associated with the historical threat information, were infected or suspicious, and may identify relationships between the historical threat information and the information indicating whether the associated host devices 205 were infected or suspicious. Based on the relationships, and based on the threat information, security platform 215 may classify host device 205 as an infected device or a suspicious device. In this way, security platform 215 trains a predictive model to classify host device 205 based on threat information, which enables security platform 215 identify and block infected devices, and monitor suspicious devices, thereby improving network security.

Additionally, or alternatively, security platform 215 may classify host device 205 as an infected device or a suspicious device based on a threat threshold configured on security platform 215. For example, in some implementations, security platform 215 may determine (e.g., as an output of a threat assessment algorithm) a threat score associated with host device 205, such as a numerical value (e.g., from 1 to 10), a letter grade (e.g., from A to F), a color level (e.g., red, yellow, or green), or the like. Here, security platform 215 may compare the threat score to one or more threat thresholds, accessible by security platform 215, and classify host device 205 as an infected device or a suspicious device based on the comparison. For example, if the threat score satisfies a first threat threshold (e.g., when the threat score is greater than or equal to the first threat threshold), then security platform 215 may classify host device 205 as an infected device. Similarly, if the threat score does not satisfy the first threat threshold (e.g., when the threat score is less than the threat threshold), but satisfies a second threat threshold, then security platform 215 may classify host device 205 as a suspicious device. Similarly, if the threat score does not satisfy the second threat threshold, then security platform 215 may classify host device 205 as a clean device (e.g., a device that is not infected or suspicious).

In some implementations, security platform 215 may classify host device 205 based on threat information associated with one or more threat scores (e.g., threat scores associated with one or more threat events). For example, security platform 215 may classify host device 205 based on a sum of the one or more threat scores, an average of the one or more threat scores, a weighted average of the one or more threat scores, a median of the one or more threat scores, or the like. In some implementations, security platform 215 may determine a confidence metric that indicates a confidence level associated with classifying the host device 205 as an infected device or a suspicious device.

In some implementations, security platform 215 may classify host device 205 as an infected device or a suspicious device in another manner, such as based on information provided by one or more other devices (e.g., when network device 210 is configured to determine a threat score, when security device 225 is configured to determine a threat score, etc.).

In some implementations, when security platform 215 classifies host device 205 as an infected device, security platform 215 may implement a blocking technique based on an attribute of host device 205 in order to prevent host device 205 from communicating with other devices.

As further shown in FIG. 4, process 400 may include providing attribute information, associated with the host device, based on classifying the host device as an infected device or a suspicious device (block 430). For example, security platform 215 may provide the attribute information, associated with host device 205, based on classifying host device 205 as an infected device or a suspicious device.

In some implementations, security platform 215 may provide the attribute information, associated with host device 205, in order to provide one or more other security services (e.g., hosted by one or more security devices 225, security platform 215, cloud computing environment 220, network device 210, or the like) with access to the attribute information of host device 205 (e.g., such that the one or more security services may be informed regarding the status of host device 205 as being infected or suspicious).

In some implementations, the attribute information may include information that identifies one or more attributes of multiple host devices 205 that have been classified as infected or suspicious. For example, security platform 215 may provide the attribute information as a feed including a list of attributes associated with host devices 205 classified as infected or suspicious, and the one or more security services may subscribe to receive the feed. In some implementations, security platform 215 may update the feed with updated and/or additional attribute information (e.g., when security platform 215 classifies another host device 205 as infected or malicious based on additional threat information).

In some implementations, security platform 215 may (e.g., automatically) provide the attribute information when security platform 215 classifies host device 205 as an infected device or a suspicious device (e.g., in real-time or near real-time). For example, security platform 215 may update a feed including a list of attributes, as described above. Additionally, or alternatively, security platform 215 may provide the attribute information based on a request provided by a security service. In some implementations, the security service may access the attribute information via an application program interface (API) associated with security platform 215.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
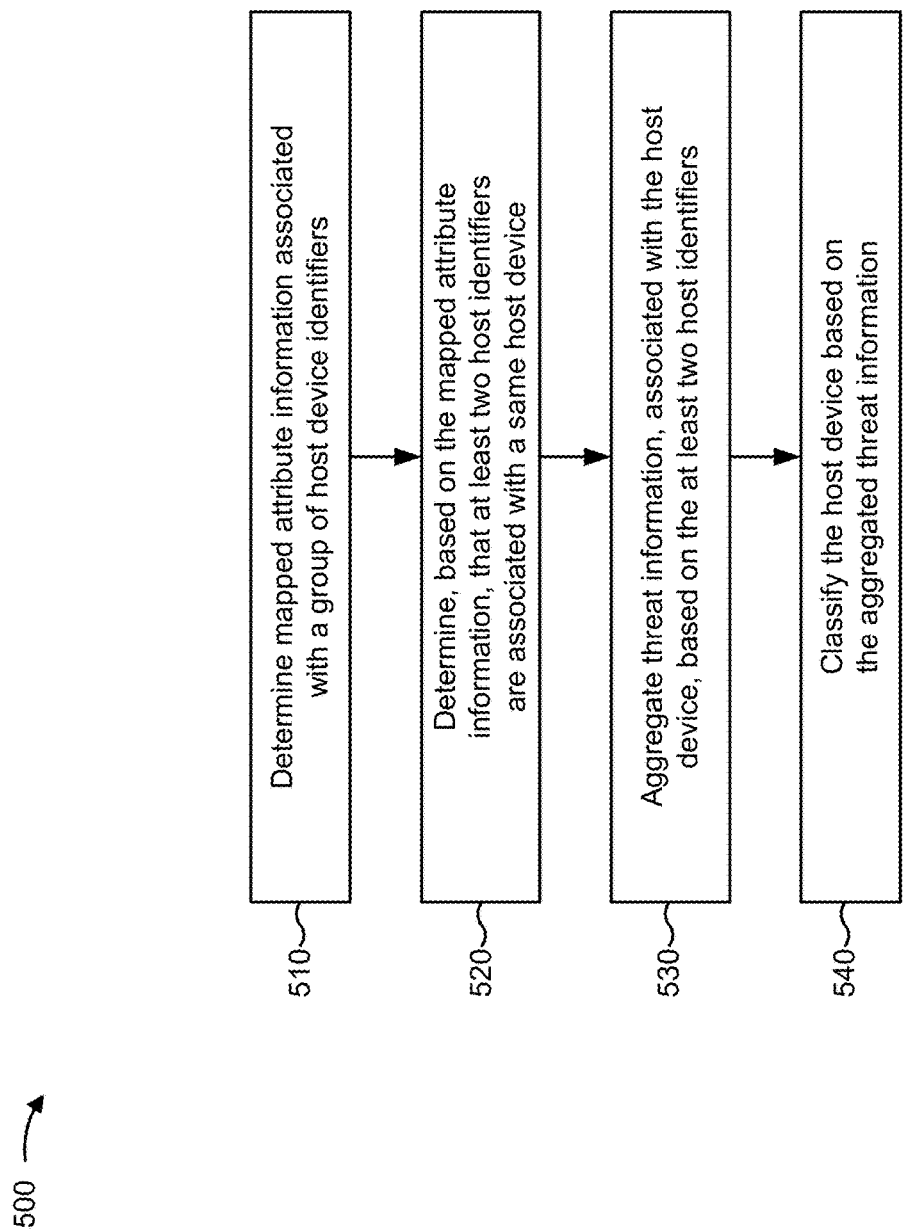
FIG. 5 is a flow chart of an example process for aggregating threat information, associated with a host device, based on at least two IP addresses associated with the host device, and classifying the host device based on the aggregated threat information.

FIG. 5 is a flow chart of an example process 500 for aggregating threat information, associated with a host device, based on at least two host identifiers associated with the host device, and classifying the host device based on the aggregated threat information. In some implementations, one or more process blocks of FIG. 5 may be performed by security platform 215. In some implementations, one or more process blocks of FIG. 5 may be performed by another device or a group of devices separate from or including security platform 215, such as network device 210.

As shown in FIG. 5, process 500 may include determining mapped attribute information associated with a group of host identifiers (block 510). For example, security platform 215 may determine mapped attribute information associated with a group of host identifiers.

In some implementations, the mapped attribute information may include information that identifies two or more related attributes. For example, the mapped attribute information may include information that identifies a first attribute (e.g., an IP address) and a second attribute (e.g., a MAC address) related to the first attribute. As another example, the mapped attribute information may include information that identifies a first attribute (e.g., a first IP address), a second attribute (e.g., a hostname), and a third attribute (e.g., a MAC address) related to the first and second attributes.

In some implementations, security platform 215 may determine the mapped attribute information based on information provided by one or more security services. For example, a security service (e.g., subscribed to receive the attribute information feed provided by security platform 215, as described above) may receive the attribute information provided by security platform 215. The security service may, during provisioning of a security service, monitor, receive, obtain, and/or determine information associated with attributes of host device 205, and determine the mapped attribute information based on the information determined during the provisioning of the security service and the attribute information provided by security platform 215.

For example, the security service may receive attribute information, provided by security platform 215 as described above, that includes an IP address. Here, the security service may determine, during provisioning of the security service, a MAC address that is related to (e.g., is associated with a same host device 205) the IP address. In this example, the mapped attribute information includes information that identifies the IP address and the MAC address associated with the IP address. The security service may provide the mapped attribute information to security platform 215.

In some implementations, security platform 215 may determine the mapped attribute information based on requesting the mapped attribute information. For example, security platform 215 may send (e.g., automatically on a periodic basis, based on user input), to one or more security services, a request to provide any mapped attribute information that corresponds to any attribute included in the attribute information feed, and may determine the mapped attribute information based on a response to the request.

Additionally, or alternatively, security platform 215 may automatically determine the mapped attribute information (e.g., when a security service is configured to provide mapped attribute information for attributes include in the attribute feed automatically).

In this way, when a particular host device 205 is associated with a different instances of an attribute (e.g., when host device 205 has been assigned multiple IP addresses over a period of time), security platform 215 may determine mapped attribute information that identifies one more other attributes (e.g., a MAC address) related to (i.e., that map to) the attribute.

As further shown in FIG. 5, process 500 may include determining, based on the mapped attribute information, that at least two host identifiers are associated with a same host device (block 520). For example, security platform 215 may determine, based on the mapped attribute information, that at least two host identifiers are associated with a same host device 205.

In some implementations, security platform 215 may determine that at least two host identifiers are associated with a same host device 205 based on the mapped attribute information and the host identifiers managed by security platform 215. For example, security platform 215 may determine that a same host device 205 is associated with two host identifiers when the mapped attribute information indicates that a first attribute (e.g., a first IP address), associated with a first host identifier, is associated with a second attribute (e.g., a particular MAC address), and that a third attribute (e.g., a second IP address), associated with a second host identifier, is also associated with the second attribute.

As another example, security platform 215 may determine that a same host device 205 is associated with three host identifiers when the mapped attribute information indicates that a first attribute (e.g., a first IP address), associated with a first host identifier, is associated with a second attribute (e.g., a particular MAC address), that a third attribute (e.g., a second IP address), associated with a second host identifier, is associated with the second attribute, and that a fourth attribute (e.g., a hostname), associated with a third host identifier, is associated with the second attribute.

As another example, security platform 215 may determine that a same host device 205 is associated with two host identifiers when the mapped attribute information indicates that a first attribute (e.g., an IP address), associated with a first host identifier, is associated with a second attribute (e.g., a particular MAC address), and that a third attribute (e.g., a hostname), associated with a second host identifier, is also associated with the second attribute.

As yet another example, security platform 215 may determine that a same host device 205 is associated with two host identifiers when the mapped attribute information indicates that a first attribute (e.g., a first IP address), associated with a first host identifier, is associated with a second attribute (e.g., an LDAP username), that the second attribute is associated with a third attribute (e.g., a MAC address), and that a fourth attribute (e.g., a second IP address), associated with a second host identifier, is associated with the third attribute.

In some implementations, security platform 215 may generate an attribute match score, associated with at least two host identifiers, that indicates a probability or likelihood that the at least two host identifiers are associated with a same host device 205. The attribute match score may include, for example, a numerical value, a percentage, a letter grade, a color level, or the like. In some implementations, the attribute match score may be determined based on a number and/or type of attributes used to determine that the at least two host identifiers are associated with a same host device 205 (e.g., where the score increases as the number of matched attributes increases). In some implementations, the attribute match score be weighted to favor a particular attribute. For example, generation of the attribute match score may be weighted to favor an attribute match associated with an attribute that is typically static or semi-static, such as a MAC address match associated with the at least two host identifiers (e.g., when matching MAC addresses may be more indicative of association with a same host device 205 than another attribute, such as a single sign-on username).

Conversely, generation of the attribute match score may be weighted to disfavor (e.g., provide comparatively less weight or no weight) an attribute match associated with an attribute that is relatively dynamic, such as an IP address match associated with the at least two host identifiers (e.g., when matching IP addresses may be less indicative of association with a same host device 205 than another attribute, such as a MAC address). In this case, security platform 215 may be configured to require one or more additional attribute matches (e.g., at least two attribute matches, a particular combination of attribute matches, and/or the like) in order to boost the attribute match score before determining that the at least two host identifiers are associated with a same host device 205.

In some implementations, security platform 215 may determine that host device 205 is associated with at least two host identifiers based on an attribute threshold configured on security platform 215. For example, in some implementations, security platform 215 may determine an attribute match score for attributes associated with at least two host identifiers. Here, security platform 215 may compare the attribute match score to an attribute match threshold, accessible by security platform 215, and determine that host device 205 is associated with the at least two host identifiers based on the comparison. For example, if the attribute match score satisfies the attribute match threshold (e.g., when the attribute match score is greater than or equal to the attribute match threshold), then security platform 215 may determine that host device 205 is associated with the at least two host identifiers associated with the attribute match score. Conversely, if the attribute match score does not satisfy the attribute match threshold (e.g., when the attribute match score is less than the attribute match threshold), then security platform 215 may determine that host device 205 is not associated with the at least two host identifiers associated with that attribute match score.

In some implementations, security platform 215 may determine a confidence metric (e.g., percentage from 0% to 100%, a probability, or the like) that indicates a confidence level associated with the determining of whether host device 205 is associated with at least two host identifiers. In some implementations, the confidence metric may be based on a number of attributes used to determine that the at least two host identifiers are associated with a same host device 205, a type of attribute used to determine that the at least two host identifiers are associated with a same host device 205, and/or the like.

As further shown in FIG. 5, process 500 may include aggregating threat information, associated with the host device, based on the at least two host identifiers (block 530). For example, security platform 215 may aggregate threat information, associated with host device 205, based on the at least two host identifiers.

In some implementations, security platform 215 may aggregate the threat information based on threat information stored or accessible by security platform 215. For example, as described above, upon classifying host device 205 as an infected device or suspicious device, security platform 215 may store threat information, associated with host device 205, such that the threat information is associated with a host identifier. In this example, security platform 215 may determine threat information, corresponding to the at least two host identifiers, based on the threat information stored or accessible by security platform 215 (e.g., by searching the stored threat information for entries corresponding to the at least two host identifiers). In some implementations, the aggregated threat information may include threat information associated with at least two (e.g., 2, 10, 100, or the like) host identifiers. In some implementations, security platform 215 may aggregate the threat information under a single host identifier by, for example, associating the threat information with one host identifier of the at least two host identifiers (e.g., rather than continuing to associate threat information with different host identifiers).

In some implementations, security platform 215 may (e.g., automatically) aggregate the threat information based on determining that host device 205 is associated with the at least two host identifiers. Additionally, or alternatively, security platform 215 may aggregate the threat information based on user input and/or based on information provided by another device (e.g., network device 210).

As further shown in FIG. 5, process 500 may include classifying the host device based on the aggregated threat information (block 540). For example, security platform 215 may classify host device 205 based on the aggregated threat information.

In some implementations, security platform 215 may classify host device 205 in a manner similar to that described above with regard to FIG. 4. In some implementations, based on the aggregated threat information, the classification of host device 205 as infected or suspicious may be improved (e.g., as compared to a classification based on threat information associated with a single threat event and/or a single instance of an attribute), thereby improving network security.

Additionally, or alternatively, security platform 215 may deprioritize one or more attributes associated with at least one of the at least two host identifiers. For example, if security platform 215 classifies host device 205 as an infected device, then security platform 215 may be configured to initiate or continue blocking associated with host device 205. In this example, security platform 215 may identify an IP address that is currently assigned to host device 205, and may deprioritize (i.e., cease blocking or refrain from blocking) one or more IP addresses that were previously assigned to host device 205. In this way, security platform 215 may prevent communications of other host devices 205 (e.g., host devices 205 assigned the one or more IP addresses at a later time) from being improperly blocked.

In some implementations, security platform 215 may perform an action based on aggregating the threat information. For example, security platform 215 may classify the host device based on the aggregated threat information, as described above. As another example, security platform 215 may (e.g., automatically, periodically, based on user input, and/or the like) report the aggregated threat information (e.g., provide a report including the aggregated threat information to, for example, a network administrator), provide the aggregated threat information for display to a user, store the aggregated threat information in a database, and/or the like.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Implementations described herein provide a security platform capable of aggregating threat information, associated with a host device, even when the host device has one or more attributes that have or can be changed. In some implementations, the security platform may aggregate the threat information based on mapped attribute information, associated with the host device, that identifies an association between at least two attributes of the host device.

In some implementations, based on the aggregated threat information, the security platform may perform an improved classification of the host device as infected or suspicious (e.g., as compared to a classification based on threat information associated with a single instance of an attribute and/or threat information associated with a single threat event), thereby improving network security. Additionally, or alternatively, the security platform may deprioritize (i.e., cease blocking) one or more attributes previously associated with the host device, thereby preventing communications of other host devices from being improperly blocked.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A security platform, comprising:
one or more processors implemented at least partially in hardware to:
create a plurality of host identifiers;
determine mapped attribute information associated with the plurality of host identifiers,
the mapped attribute information including information that identifies a set of related attributes;
determine, based on the mapped attribute information, that a host device is associated with at least two host identifiers of the plurality of host identifiers;
aggregate, based on determining that the host device is associated with the at two least host identifiers, threat information as aggregated threat information associated with the host device;
classify the host device based on the aggregated threat information; and
based on the classification, at least one of:
alter a status of the host device to infected or malicious; or
deprioritize an attribute associated with the host device.

2. The security platform of claim 1, where the set of attributes includes at least one of:
an Internet protocol (IP) address associated with a host identifier of the plurality of host identifiers,
a hostname associated with the host identifier of the plurality of host identifiers,
a media access control (MAC) address associated with a host identifier of the plurality of host identifiers,
a username associated with the host identifier of the plurality of host identifiers, or
a single sign-on username associated with the host identifier of the plurality of host identifiers.

3. The security platform of claim 1, where the one or more processors, when aggregating the threat information, are to:
aggregate the threat information under a single host identifier of the at least two host identifiers, and
where the threat information is aggregated based at least in part on the single host identifier being associated, by the mapped attribute information, with at least one attribute that is also associated, by the mapped attribute information, with another host identifier of the at least two host identifiers.

4. The security platform of claim 1, where the one or more processors are further to:
provide an item of attribute information, associated with a host identifier, to one or more security services,
the item of attribute information being provided based on a previous classification of the host device as an infected device or a suspicious device, and
the host identifier being one of the plurality of host identifiers; and
where the one or more processors, when determining the mapped attribute information, are to:
determine the mapped attribute information based on providing the item of attribute information to the one or more security services.

5. The security platform of claim 1, where the one or more processors are further to:
  identify a first attribute, associated with one of the at least two host identifiers, as a current attribute associated with the host device; and
  prevent communications, associated with another host device, from being blocked based on a second attribute, associated with another of the at least two host identifiers, after identifying the first attribute as the current attribute associated with the host device.

6. The security platform of claim 1, where the one or more processors are further to:
  determine first threat information, associated with the host device, based on a first host identifier of the at least two host identifiers;
  determine second threat information, associated with the host device, based on a second host identifier of the at least two host identifiers; and
  where the one or more processors, when aggregating the threat information, are to:
    aggregate the threat information based on the first threat information and the second threat information.

7. The security platform of claim 1, where the one or more processors are further to:
  determine that a weighted attribute match score, associated with attributes of the at least two host identifiers, satisfies a threshold; and
  where the one or more processors, when determining that the host device is associated with the at least two host identifiers, are to:
    determine that the host device is associated with the at least two host identifiers based on the weighted attribute match score satisfying the threshold.

8. A non-transitory computer-readable medium storing instructions, the instructions comprising:
  one or more instructions that, when executed by one or more processors, cause the one or more processors to:
    create a plurality of host identifiers;
    receive mapped attribute information associated with theft plurality of host identifiers,
      the mapped attribute information including information that identifies a set of related attributes;
    determine, based on the mapped attribute information, that a host device is associated with at least two host identifiers of the plurality of host identifiers;
    aggregate, based on determining that the host device is associated with the at least two host identifiers, threat information as aggregated threat information associated with the host device;
    perform an action based on aggregating the threat information, the action comprising at least one of:
      altering a status of the host device to infected or malicious; or
      deprioritizing an attribute associated with the host device.

9. The non-transitory computer-readable medium of claim 8, where the one or more instructions, that cause the one or more processors to perform the action, cause the one or more processors to:
  report the aggregated threat information, or
  provide the aggregated threat information for display to a user.

10. The non-transitory computer-readable medium of claim 8, where the set of related attributes includes at least one of:
  an Internet protocol (IP) address associated with a host identifier of the plurality of host identifiers,
  a hostname associated with the host identifier of the plurality of host identifiers,
  a media access control (MAC) address associated with a host identifier of the plurality of host identifiers,
  a username associated with the host identifier of the plurality of host identifiers, or
  a single sign-on username associated with the host identifier of the plurality of host identifiers.

11. The non-transitory computer-readable medium of claim 8, where the one or more instructions, that cause the one or more processors to aggregate the threat information, cause the one or more processors to:
  aggregate the threat information under a single host identifier of the at least two host identifiers, and
  where the threat information is aggregated based at least in part on the single host identifier being associated, by the mapped attribute information, with at least one attribute that is also associated, by the mapped attribute information, with another host identifier of the at least two host identifiers.

12. The non-transitory computer-readable medium of claim 8, where the one or more instructions, when executed by the one or more processors, further cause the one or more processors to:
  provide an item of attribute information, associated with a host identifier, to one or more security services,
    the item of attribute information being provided based on a previous classification of the host device as an infected device or a suspicious device, and
    the host identifier being one of the plurality of host identifiers; and
  where the one or more instructions, that cause the one or more processors to receive the mapped attribute information, cause the one or more processors to:
    receive the mapped attribute information based on providing the item of attribute information to the one or more security services.

13. The non-transitory computer-readable medium of claim 8, where the one or more instructions, when executed by the one or more processors, further cause the one or more processors to:
  identify a first attribute, associated with one of the at least two host identifiers, as a current attribute associated with the host device; and
  prevent communications from being blocked based on a second attribute, associated with another of the at least two host identifiers, after identifying the first attribute as the current attribute associated with the host device.

14. The non-transitory computer-readable medium of claim 8, where the one or more instructions, when executed by the one or more processors, further cause the one or more processors to:
  determine first threat information, associated with the host device, based on a first host identifier of the at least two host identifiers;
  determine second threat information, associated with the host device, based on a second host identifier of the at least two host identifiers; and
  where the one or more instructions, that cause the one or more processors to aggregate the threat information, cause the one or more processors to:
    aggregate the threat information based on the first threat information and the second threat information.

15. The non-transitory computer-readable medium of claim 8, where the one or more instructions, when executed by the one or more processors, further cause the one or more processors to:

determine a confidence metric associated with attributes of the at least two host identifiers; and where the one or more instructions, that cause the one or more processors to determine that the host device is associated with the at least two host identifiers, cause the one or more processors to:

determine that the host device is associated with the at least two host identifiers based on the confidence metric.

16. A method, comprising:

creating, by a security platform, a plurality of host identifiers;

determining, by the security platform, mapped attribute information associated with a plurality of host identifiers,
the mapped attribute information including information that identifies a set of related attributes;

determining, by the security platform and based on a weighted attribute match score, associated with attributes of at least two host identifiers of the plurality of host identifiers, satisfying a threshold, that a host device is associated with the at least two host identifiers;

aggregating, by the security platform and based on the at two least host identifiers, threat information as aggregated threat information associated with the host device;

classifying, by the security platform, the host device based on the aggregated threat information; and based on the classification, at least one of:
altering a status of the host device to infected or malicious; or
deprioritizing an attribute associated with the host device.

17. The method of claim 16, where aggregating the threat information comprises:

aggregating the threat information under a single host identifier of the at least two host identifiers, and where the threat information is aggregated based at least in part on the single host identifier being associated, by the mapped attribute information, with at least one attribute that is also associated, by the mapped attribute information, with another host identifier of the at least two host identifiers.

18. The method of claim 16, further comprising:

providing an item of attribute information, associated with a host identifier, to one or more security services,
the item of attribute information being provided based on a previous classification of the host device as an infected device or a suspicious device, and
the host identifier being one of the plurality of host identifiers; and where determining the mapped attribute information comprises:
determining the mapped attribute information based on providing the item of attribute information to the one or more security services.

19. The method of claim 16, further comprising:

identifying a first attribute, associated with one of the at least two host identifiers, as a current attribute associated with the host device; and preventing communications, associated with another host device, from being blocked based on a second attribute, associated with another of the at least two host identifiers, after identifying the first attribute as the current attribute associated with the host device.

20. The method of claim 16, further comprising:

determining first threat information, associated with the host device, based on a first host identifier of the at least two host identifiers;

determining second threat information, associated with the host device, based on a second host identifier of the at least two host identifiers; and where aggregating the threat information comprises:
aggregating the threat information based on the first threat information and the second threat information.

* * * * *

UNITED STATES PATENT AND TRADEMARK OFFICE
CERTIFICATE OF CORRECTION

PATENT NO. : 10,834,103 B2
APPLICATION NO. : 15/942530
DATED : November 10, 2020
INVENTOR(S) : Karthik Ragunath Balasundaram et al.

It is certified that error appears in the above-identified patent and that said Letters Patent is hereby corrected as shown below:

Claim 8:
Column 19, Line 40 change "theft plurality of host identifiers," to --the plurality of host identifiers,--

Signed and Sealed this
Fifth Day of January, 2021

Andrei Iancu
*Director of the United States Patent and Trademark Office*